(12) United States Patent
Maciejczyk

(10) Patent No.: US 7,461,893 B2
(45) Date of Patent: Dec. 9, 2008

(54) LATCHING MEANS FOR A SAFETY SEAT

(75) Inventor: Wieslaw Maciejczyk, Victoria (AU)

(73) Assignee: Britax Childcare Pty Ltd, Victoria (AU)

( * ) Notice: Subject to any disclaimer, the term of this patent is extended or adjusted under 35 U.S.C. 154(b) by 0 days.

(21) Appl. No.: 11/569,724

(22) PCT Filed: Jun. 8, 2005

(86) PCT No.: PCT/AU2005/000811

§ 371 (c)(1), (2), (4) Date: Nov. 28, 2006

(87) PCT Pub. No.: WO2005/120886

PCT Pub. Date: Dec. 22, 2005

(65) Prior Publication Data

US 2007/0210632 A1    Sep. 13, 2007

(30) Foreign Application Priority Data

Jun. 9, 2004    (AU) .............................. 2004903093

(51) Int. Cl.
*B60N 2/42* (2006.01)
*A47D 1/10* (2006.01)

(52) U.S. Cl. .............................. 297/216.11; 297/256.16

(58) Field of Classification Search ............ 297/216.11, 297/256.16
See application file for complete search history.

(56) References Cited

U.S. PATENT DOCUMENTS

| 4,943,113 | A | 7/1990 | Meeker | |
|---|---|---|---|---|
| 6,183,044 | B1* | 2/2001 | Koyanagi et al. | 297/256.16 |
| 6,199,949 | B1* | 3/2001 | DaSilva | 297/256.12 |
| 6,331,032 | B1* | 12/2001 | Haut et al. | 297/130 |
| 6,669,288 | B2* | 12/2003 | Nakagawa et al. | 297/256.16 X |
| 2002/0163232 | A1 | 11/2002 | Vezinet et al. | |
| 2003/0164632 | A1* | 9/2003 | Sedlack | 297/256.16 |
| 2005/0127727 | A1* | 6/2005 | Gangadharan et al. | 297/256.16 X |

FOREIGN PATENT DOCUMENTS

| JP | 9254687 | 9/1997 |
|---|---|---|
| WO | WO 2005/120886 A1 | 12/2005 |

* cited by examiner

*Primary Examiner*—Anthony D. Barfield
(74) *Attorney, Agent, or Firm*—Adams Intellectual Property Law, P.A.

(57) ABSTRACT

An infant restraint for a motor vehicle comprising a base (10) located on and secured to the seat of a motor vehicle, an infant seat (12) releasably attached to the base (10) and a hook arrangement between the base (10) and the infant seat (12) that operatively engages the infant seat (12) to hold the infant seat with respect to the base (10) when the infant seat (12) is forced forward with respect to the base (10). The invention provides a means of holding the infant seat (12) to the base (10) that becomes active during a vehicle collision.

9 Claims, 5 Drawing Sheets

LATCHING MEANS FOR A SAFETY SEAT

FIELD OF INVENTION

This invention relates to an infant restraint and particularly to a restraint of the type that comprises a base that releasably supports an infant seat.

BACKGROUND OF THE INVENTION

The most common form of restraint for infants under 6 months of age, is a child seat that locates within a motor vehicle so that the infant is rearward facing with respect to the vehicle. The restraint comprises a base that is secured with respect to the vehicle seat and an infant seat that locates within the base. The vehicle seat belts may be used to secure the base to the vehicle seat. The infant seat has restraining means such as a harness within the seat to hold an infant with respect to the seat.

Examples of such infant restraints are shown in Australian Patent No. 548416 and U.S. Pat. No. 4,943,113. Such infants seats as shown in the two patents use a latching mechanism to hold the infant seat with respect to the base. In both instances, the latching mechanism automatically engages upon an infant seat being placed with respect to the base and, has a manual release mechanism to allow the seat to be released from the base. This latching mechanism is relied upon to provide a sufficient holding force to hold the infant seat with respect to the base under collision loads.

An important requirement is to ensure that, during collision, the head end of the infant seat does not rotate downwardly to an extent that is greater than the prescribed limits. Such limits are generally prescribed by standards such as the United States Federal Motor Vehicle Standard FMVSS213 and other equivalent international standards.

Factors that contribute to downward rotation of the head end of the infant seat are compressibility of the vehicle seat and movement of the infant seat with respect to the base.

It is common for the base to be restrained with respect to the vehicle seat by the vehicle seat belts. The seat belts engage the base at a point that is close to the backrest of the vehicle seat. During collision, there is generally both forward force resolving from the rapid deceleration of the vehicle together with a downwards force causing rotation of the infant seat and base about the seat belt restraint so as to compress the vehicle seat.

In addition, there will be movement between the infant seat and the base. The base and infant seat are generally injection molded plastic components and so there will be some flexibility, particularly under high loads. Accordingly, the infant seat can move forward with respect to the base when impact forces are applied to the infant seat.

The combination of deflection resulting from deformation of the plastic components together with compression of the vehicle seat will often lead to an extent of rotation that is unacceptable.

Accordingly, it is an object of this invention to reduce the extent of rotation of the infant seat.

SUMMARY OF THE INVENTION

In one aspect, the invention comprises an infant restraint for a motor vehicle comprising; a base to be located on and secured to a seat of said motor vehicle, an infant seat releasably attachable to said base, and hook means between said base and infant seat that operatively engages said infant seat to hold the said infant seat with respect to said base when said infant seat is forced forward with respect to said base.

Prefrerably the hook means is mounted to said base.

It will be seen by this invention when the infant seat is forced forward with respect to said base due to collision of said motor vehicle the hook meeand on the base operatively engages with the infant seat to prevent rotation of the infant seat with respect to the base.

Preferably the infant seat is releasably attached to said base by a releasably engageable latch.

Preferably the hook means comprises at least one upstanding L-shaped post having a portion extending away from said post, said portion extending away from said post extending towards the rear of said vehicle when the infant restraint is mounted therein.

The portion extending away from said post preferably comprises a planar flange.

There may be at least one aperture in said infant seat which locates over said hook means, said hook means engagable on a edge of said aperture when said infant seat is forced forward with respect to said base.

Preferably the hook means aligns with said aperture so that said infant seat can be located on and removed from said base without interference by said hook means, said hook means relying upon differential movement between said infant seat and said base during a collision to operatively engage the edge of said aperture.

Preferably an outward edge of said flange does not overlap the edge of said aperture except upon relative movement between said infant seat and said base during a collision.

There may be two hook means on the base.

Preferably the hook means are located adjacent a foot end of said infant seat.

In an alternative form the invention comprises an infant restraint for a motor vehicle comprising; a base to be located on and secured to a seat of the motor vehicle, an infant seat releasably attachable to the base, a pair of hooks mounted on the base, each hook comprising an upstanding post and a flange portion extending away from the post, the flange portion extending towards the rear of the vehicle when the infant restraint is mounted therein, a pair of apertures in the infant seat, each aperture being aligned with a respective hook so that the infant seat can be located on and removed from the base without interference by the hooks and each aperture having a edge which engages with the flange portion when the infant seat is forced forward with respect to the base.

In an alternative form the invention comprises a base for use with an infant seat to comprise an infant restraint in a motor vehicle, said base including a pair of hooks mounted on the base, each hook comprising an upstanding post and a flange portion extending away from the post, the flange portion extending towards the rear of the vehicle when the infant restraint is mounted therein.

In order to fully understand the invention, a preferred embodiment will now be described. However, it should be realized that the scope of the invention is not to be restricted to the features of this embodiment. Modifications and variations such as would be apparent to a skilled addressee are to be deemed within the scope of the present invention.

BRIEF DESCRIPTION OF THE DRAWINGS

This embodiment is illustrated in the accompanying drawings and photographs wherein.

DESCRIPTION OF THE PREFERRED EMBODIMENT

Figure 1:
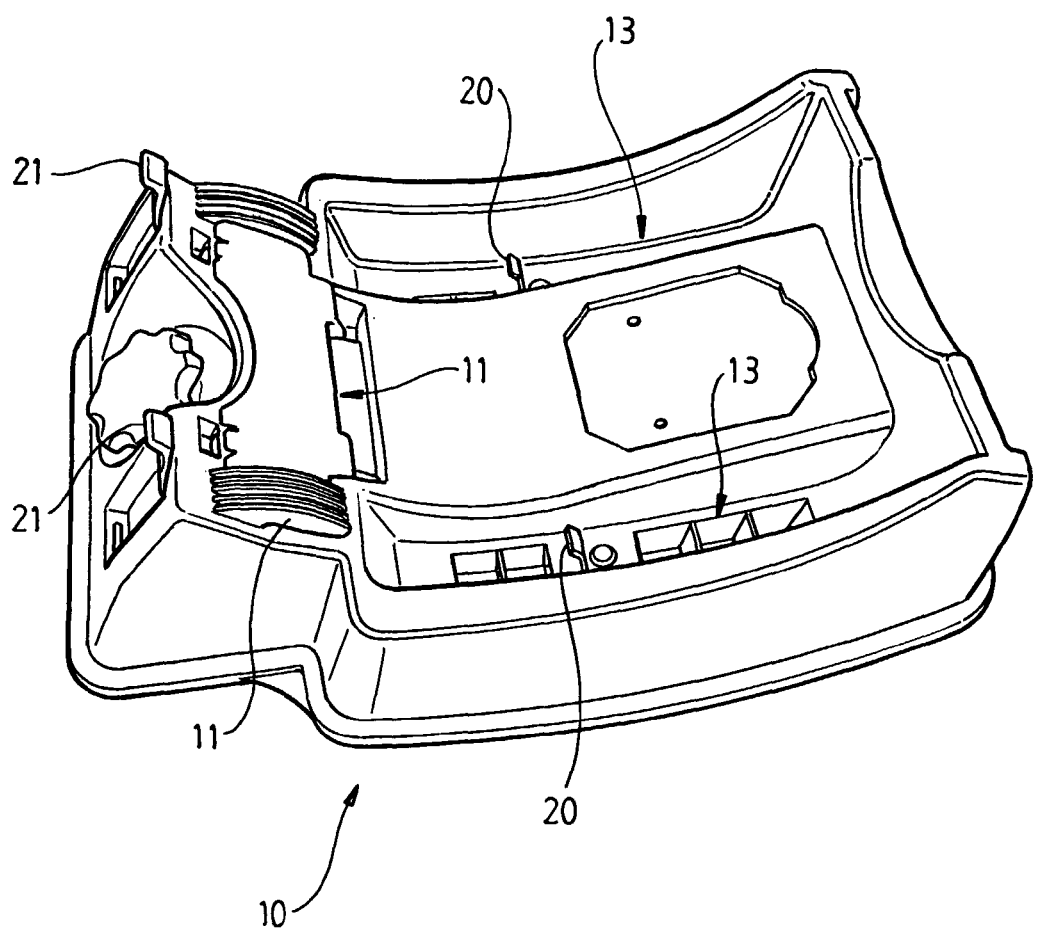
FIG. 1 shows a perspective view of a base according to one embodiment of the invention.

One embodiment of infant seat and base is shown in FIGS. 1 to 4. In this embodiment, the base 10 is provided with a seat belt locating means 11 that allows a seat belt (not shown) to secure the base 10 to a vehicle seat 12. The base 10 has longitudinal recesses 13 that are engaged by projections 14 on the infant seat 15. The infant seat 15 has a seat portion 16 and a back portion 17. When the infant seat 15 is located within the base, the backrest portion 17 positions so that it is at an angle with respect to the horizontal.

Within the recesses 13, there are latching posts 20 and there are spring loaded hooks (not shown) on the infant seat 15 that automatically engage apertures within the latching posts 20. By placing the infant seat 15 into the base 10 so that the projections 14 locate within the recess 13, the infant seat 15 will automatically latch to the base 10. The infant seat 15 has a manual release (not shown) which enables it to be disconnected from the base 10.

As a result of a single latch between the base 10 and the infant seat 15, and also due to the resilient nature of the material from which both components are molded, then there tends to be some displacement of the infant seat 15 with respect to the base 10 under impact loads. In addition, the single two latches between the base 10 and infant seat 15, are transversely aligned so there is minimal resistance to rotation of the infant seat 15 with respect to the base.

In order to restrain this excessive movement of the infant seat 15 with respect to the base 10, a pair of hooks 21 are attached to base 10 and they locate through corresponding apertures 22 in the infant seat 15. The hooks 21 and corresponding apertures 22 engage during a collision to hold the infant seat 15 with respect to the base 10.

Each of the hook means 21 comprises an upwardly extending post 23 that is secured to the base 10. The end of the post 23 has a hook comprising a flange 24 that extends from the post 23 in a direction that is towards the foot end of the infant seat 15.

With respect to each aperture 22 in the infant seat 15, there is a hook engaging edge which in this embodiment comprises a surface 25 which is the portion of the infant seat 15 immediately adjacent the aperture 22.

In normal use, the aperture 22 aligns with the post 23 and flange 24 so that, as the infant seat 15 is attached to the base 10, the flange 24 and post 23 locate through the aperture 22. The projections 14 on the infant seat 15 have surfaces which engage with the corresponding surfaces in the recess 13 that ensure alignment of the post and flange 24 with the aperture 22 at the point where the flange 24 is immediately adjacent in the aperture 22.

The projections 14 locating within the recesses 13 also accurately position the edge 26 of the surface 25 so that it is substantially directly below the forward edge 27 of the flange 24. In this position, any forward movement of the infant seat 15 with respect to the base 10 will result in the edge 26 locating beneath flange 24. Accordingly, any tendency for rotation of the infant seat 15 with respect to the base 10 will be arrested by the surface 25 engaging the flange 24.

Figure 5:
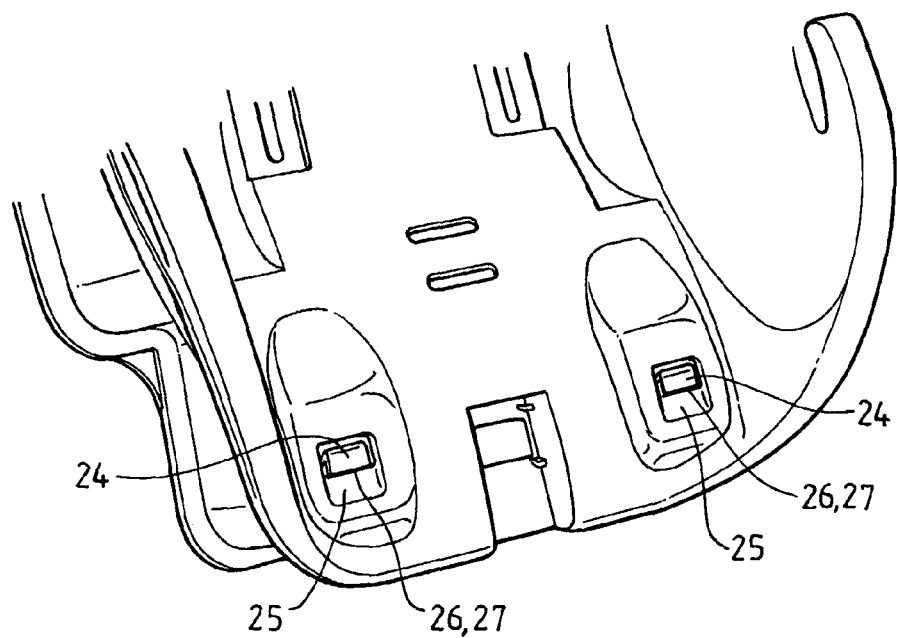
FIG. 5 shows a closer view of the hook means on the base engaged in an aperture in the infant seat.

The location of the post 23 towards the forward edge of the base 10 positions the latching means adjacent to the seat belt locating means 11 and therefore provides maximum resistance to movement of the infant seat 15 with respect to the vehicle seat belt. Accordingly, as seen in FIG. 5, there should be a reduction in rotation of the head end of the infant seat 15 as any rotation should be largely limited to that which is due to compression of the vehicle seat 12.

Figure 2:
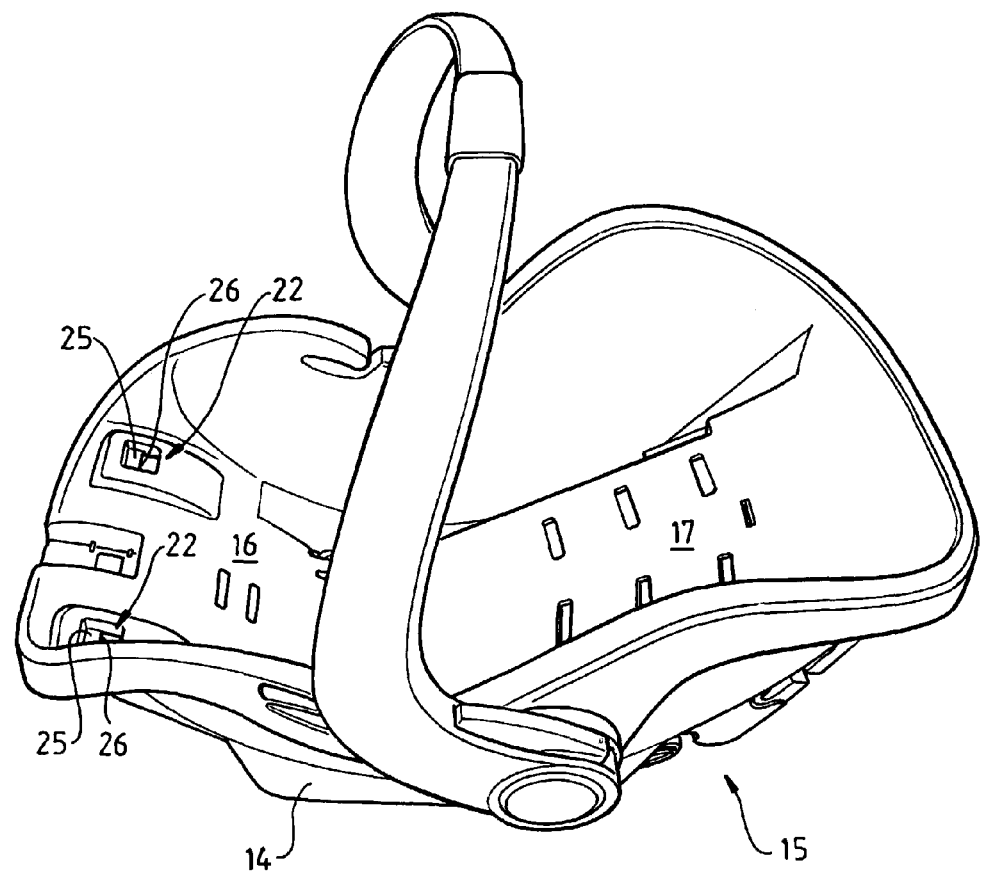
FIG. 2 shows a perspective view of an infant seat according to one embodiment of the invention.
Figure 3:
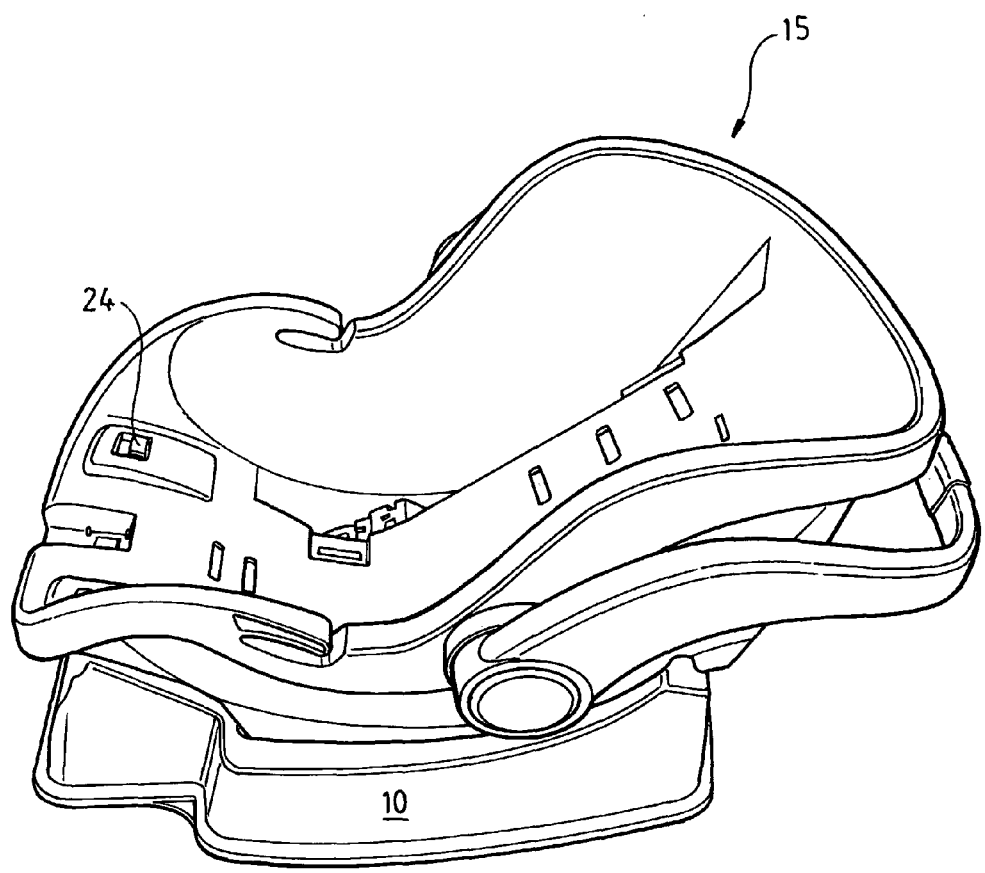
FIG. 3 shows a perspective view of the base as shown in FIG. 1 assembled with an infant seat as shown in FIG. 2.
Figure 4:
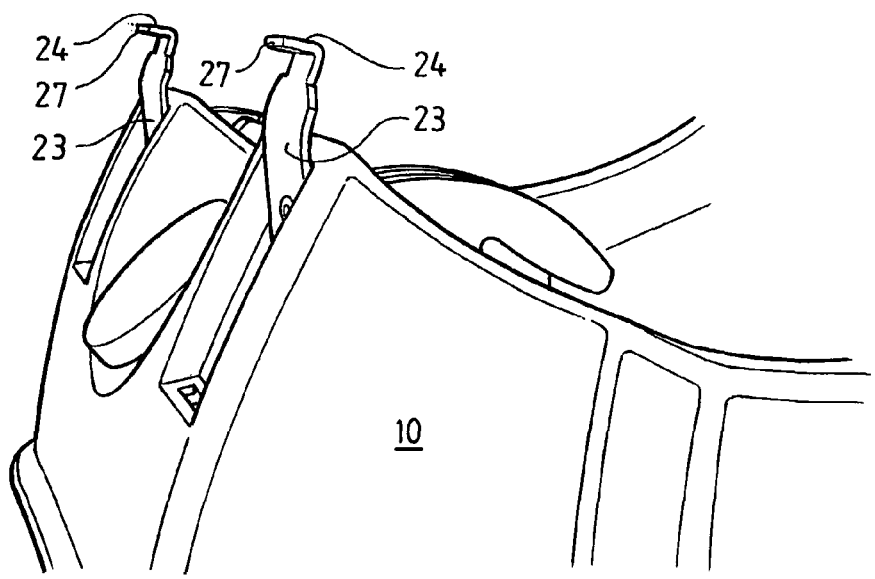
FIG. 4 shows a closer view of the hook means on the base according to one embodiment of the invention.
Figure 6:
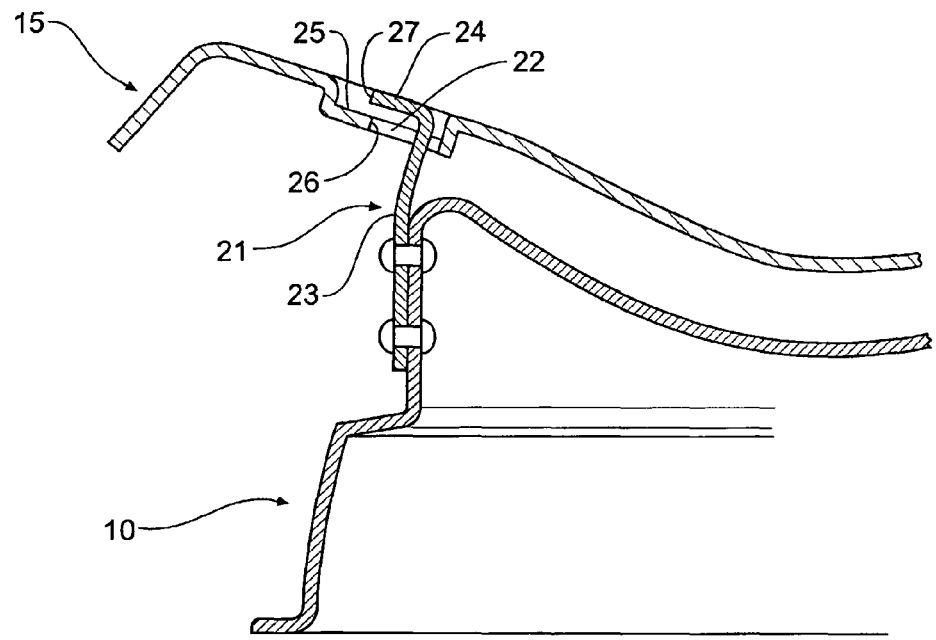
FIG. 6 shows a detailed cross sectional view of a portion of the base and infant seat as shown in FIGS. 1 and 2 with the hook means received in the aperture.
Figure 7:
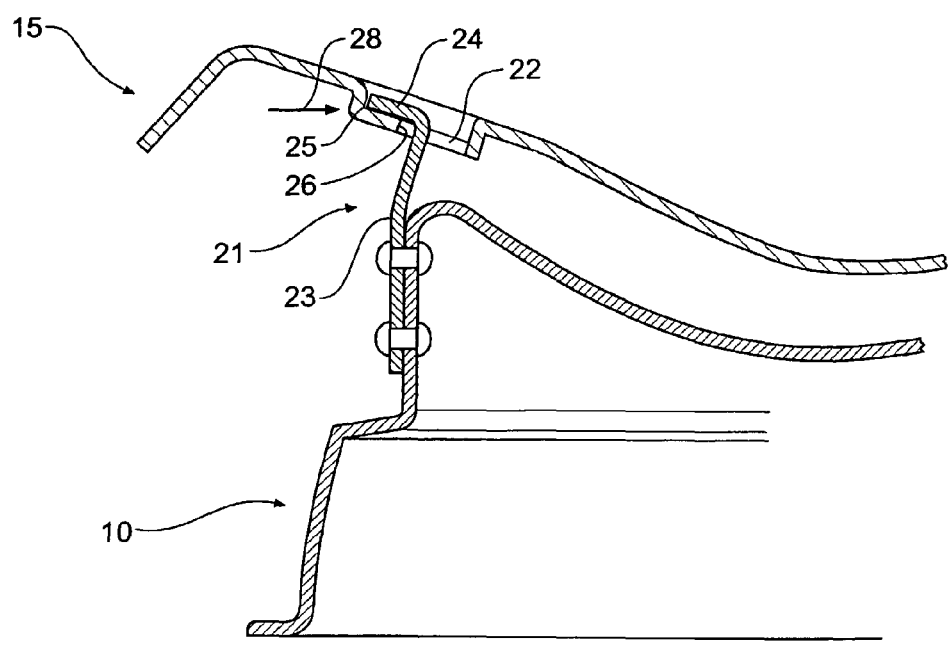
FIG. 7 shows the view of FIG. 6 but with the hook means engaged onto the edge of the aperture as would occur in the event of a collision.

FIG. 6 shows a detailed cross sectional view of a portion of the base and infant seat as shown in FIGS. 1 and 2 with the hook means received in the aperture and FIG. 7 shows the view of FIG. 6 but with the hook means engaged onto the edge of the aperture as would occur in the event of a collision.

In the position with the infant seat 15 normally mounted onto the base 10 the flange 24 on the hook means 21 on the base 10 enters the aperture 22 in the infant seat 15 but does not engage with the edges of the aperture 22. This position is shown in FIG. 6. In the event of a collision, however, the seat 15 moves with respect to the base 10 in the direction shown by the arrow 28 in FIG. 7 so that the flange 24 on the hook means 21 overlies the surface 25 extending back from the edge 26 of the aperture 22.

Hence any tendency for the infant seat to rotate with respect to the base about the latching arrangement (not shown in FIGS. 6 and 7) will be prevented.

In addition to the use of a hook means 21 in relation to an aperture 22, the hook means may comprise other arrangements. For example, the hook means may incorporate elements that rotate into a hooking position using the inertia of the element under impact conditions. Other variations will be possible and are considered to be within the scope of this invention.

Throughout this specification various indications have been given as to the scope of this invention but the invention is not limited to any one of these but may reside in two or more of these combined together. The examples are given for illustration only and not for limitation.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The claims defining the invention are as follows:

1. An infant restraint for a motor vehicle comprising;
   (a) a base adapted to be located on and secured to a seat of the motor vehicle;
   (b) an infant seat releasably attachable to the base;
   (c) a hook secured between the base and the infant seat that operatively engages the infant seat, the hook having at least one upstanding L-shaped post having a planar flange extending towards the rear of the motor vehicle when the infant restraint is mounted therein; and
   (d) an aperture in the infant seat adapted to locate over the hook, the aperture having an edge adapted to be engaged by the hook to hold the infant seat in its attached condition with respect to the base when the vehicle is abruptly slowed or stopped.

2. An infant restraint according to claim 1, wherein the hook is mounted to the base.

3. An infant restraint according to claim 1, wherein the infant seat is attached to the base by a releasably engageable latch.

4. An infant restraint according to claim 1, wherein the hook aligns with the aperture so that the infant seat can be located on and removed from the base without interference by the hook, the hook responsive to differential movement between the infant seat and the base during abrupt slowing or stopping as in a collision to operatively engage the edge of the aperture.

5. An infant restraint according to claim 1, wherein an outward edge of the flange is adapted to overlap the edge of the aperture only upon relative movement between the infant seat and the base.

6. An infant restraint according to claim 1, and including two hooks.

7. An infant restraint according to claim 1, wherein the hook is located adjacent a foot end of the infant seat.

8. An infant restraint for a motor vehicle, comprising:
(a) a base adapted to be located on and secured to a seat of the motor vehicle;
(b) an infant seat releasably attachable to the base;
(c) a pair of hooks mounted on the base, each hook comprising an upstanding post, and a flange portion extending away from the post, the flange portion extending towards the rear of the vehicle when the infant restraint is mounted therein; and
(d) a pair of apertures in the infant seat, each aperture being aligned with a respective hook so that the infant seat can be positioned on and removed from the base without interference by the hooks, each aperture having an edge which engages with the flange portion and the respective hook when the infant seat moves forward with respect to the base.

9. An infant restraint for a motor vehicle comprising;
(a) a base adapted to be located on and secured to a seat of the motor vehicle;
(b) an infant seat releasably attachable to the base;
(c) a hook mounted on the base; and
(d) an aperture in the infant seat aligned with the hook so that the infant seat can be positioned on and removed from the base without interference by the hook, the aperture having an edge which engages with the hook to hold the infant seat in its attached condition with respect to the base when the vehicle is abruptly slowed or stopped.

* * * * *